May 31, 1932.  A. SCHLAEPFER  1,861,096
MACHINE FOR WRAPPING AND TYING CYLINDRICAL BODIES
Filed Aug. 31, 1927   19 Sheets-Sheet 1

Inventor
Arnold Schlaepfer
By B. Singer, Atty.

May 31, 1932. A. SCHLAEPFER 1,861,096
MACHINE FOR WRAPPING AND TYING CYLINDRICAL BODIES
Filed Aug. 31, 1927 19 Sheets-Sheet 2

May 31, 1932. A. SCHLAEPFER 1,861,096
MACHINE FOR WRAPPING AND TYING CYLINDRICAL BODIES
Filed Aug. 31, 1927 19 Sheets-Sheet 3
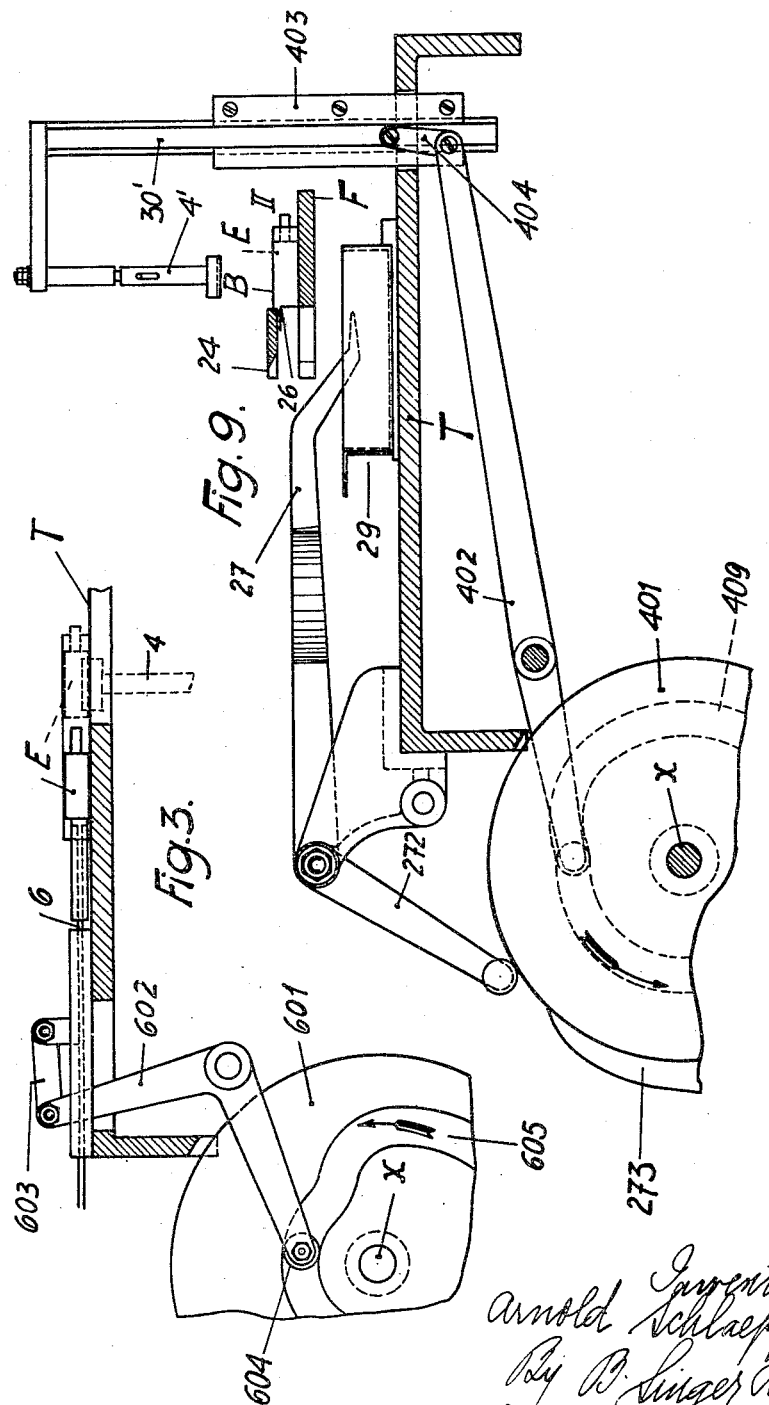

May 31, 1932. A. SCHLAEPFER 1,861,096
MACHINE FOR WRAPPING AND TYING CYLINDRICAL BODIES
Filed Aug. 31, 1927 19 Sheets-Sheet 4
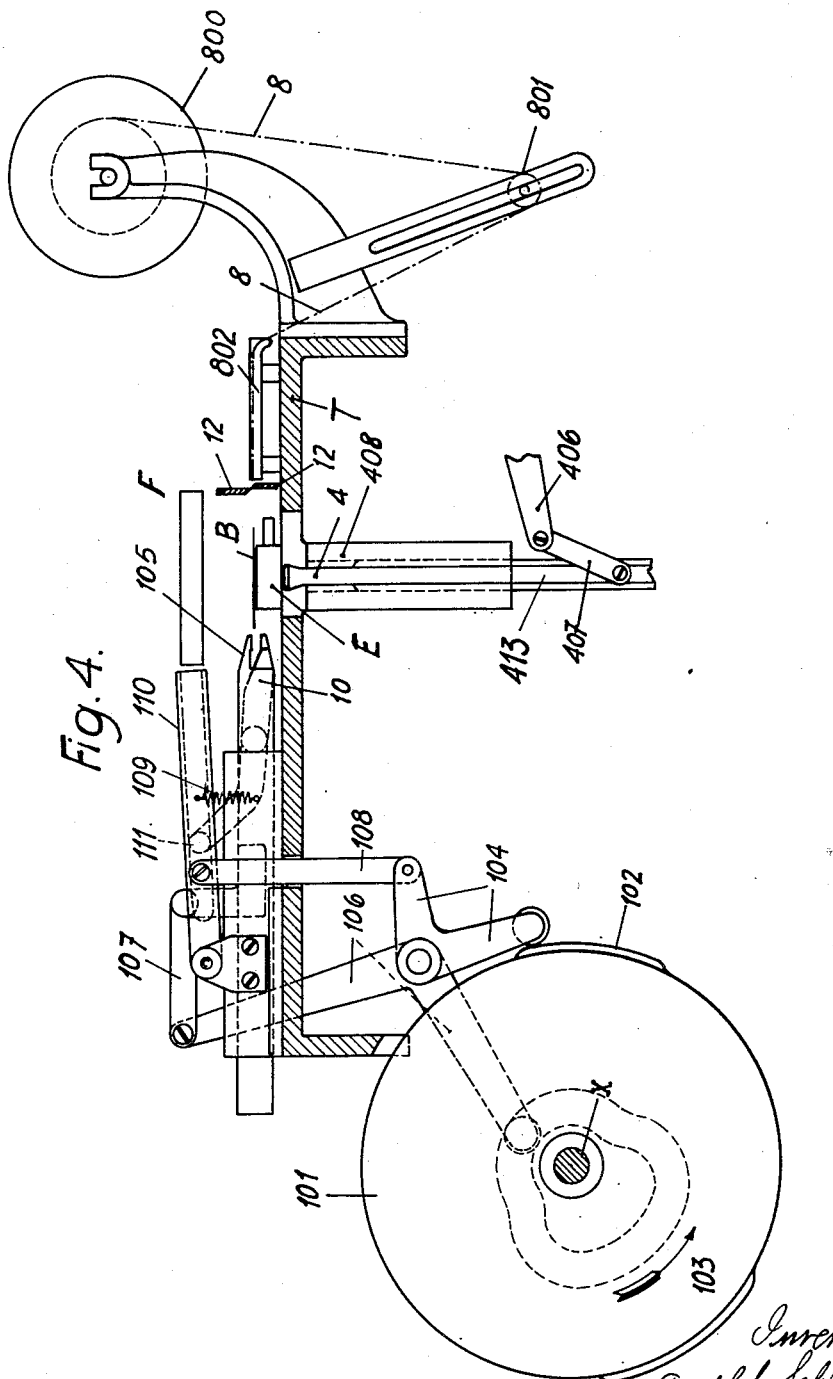

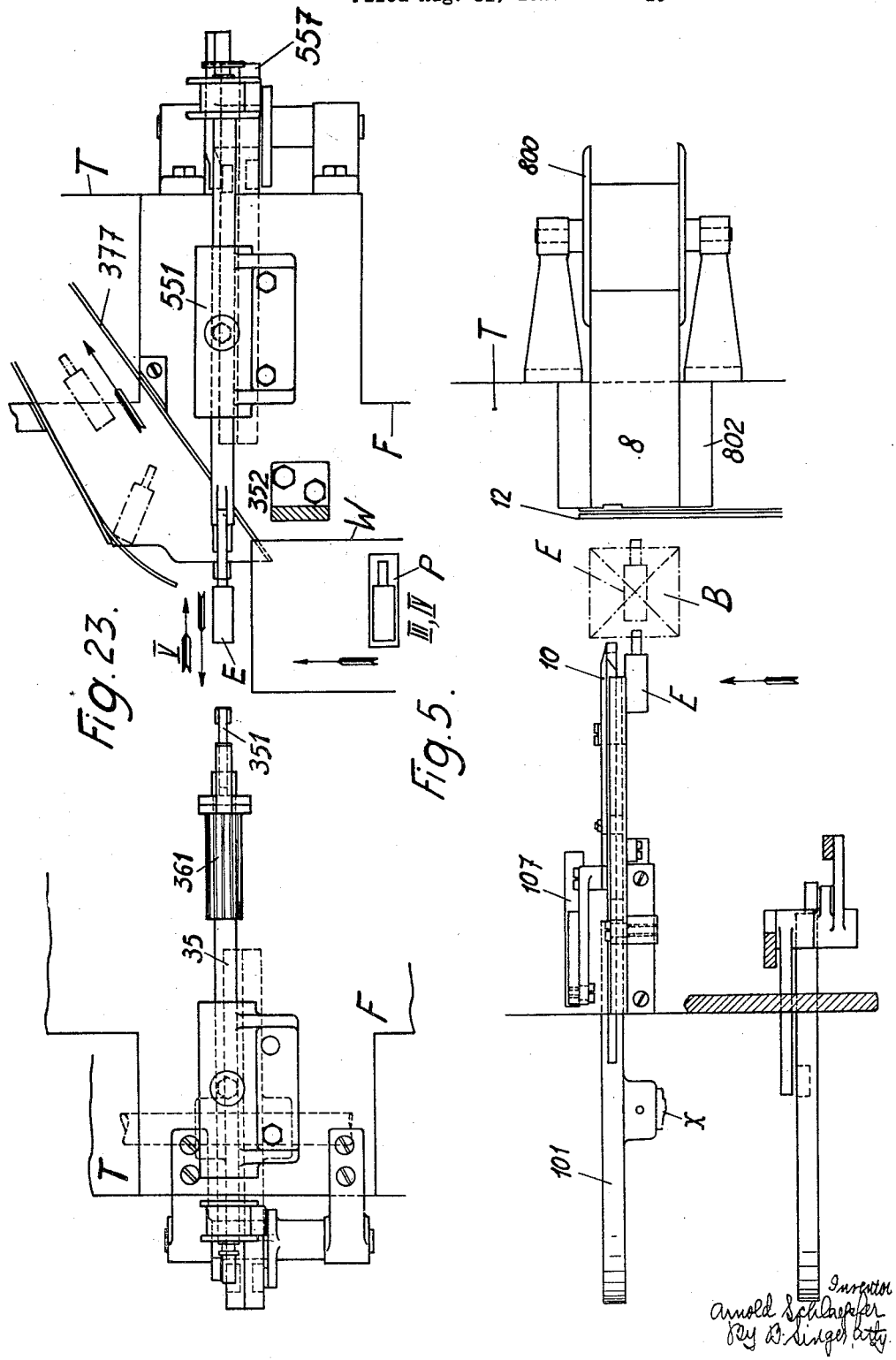

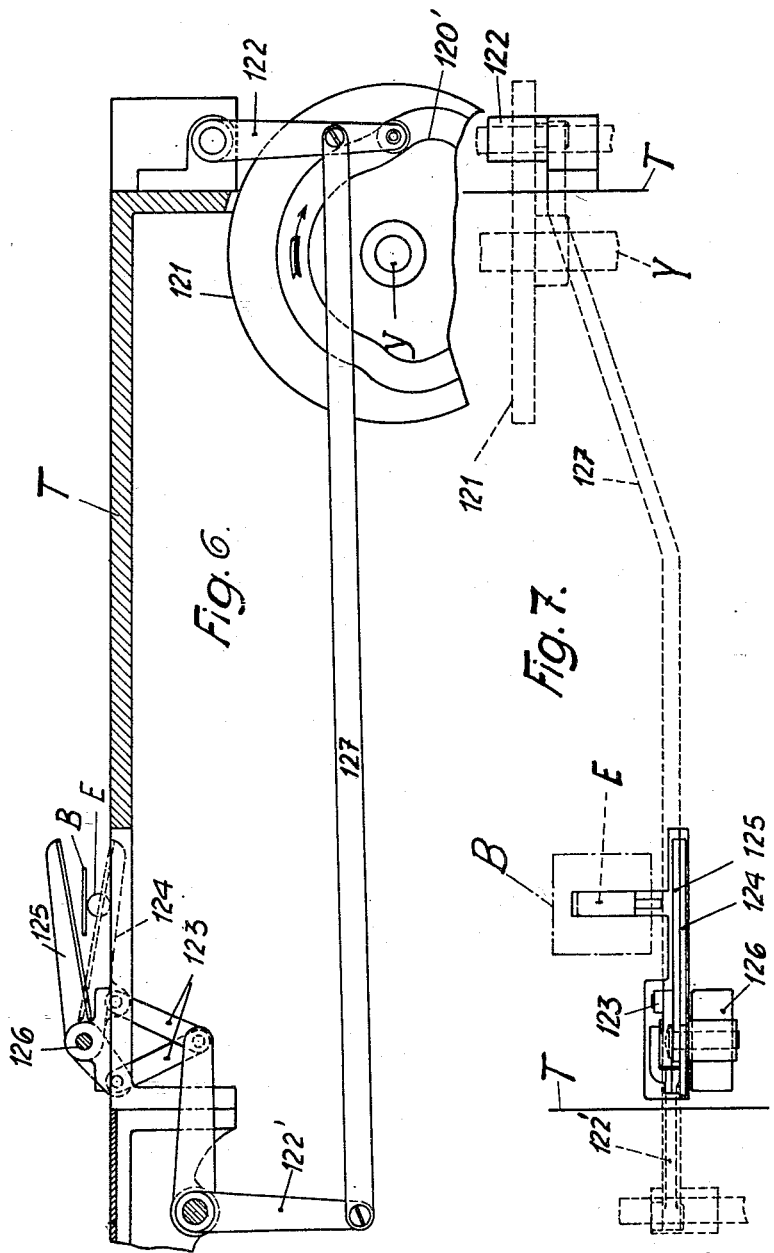

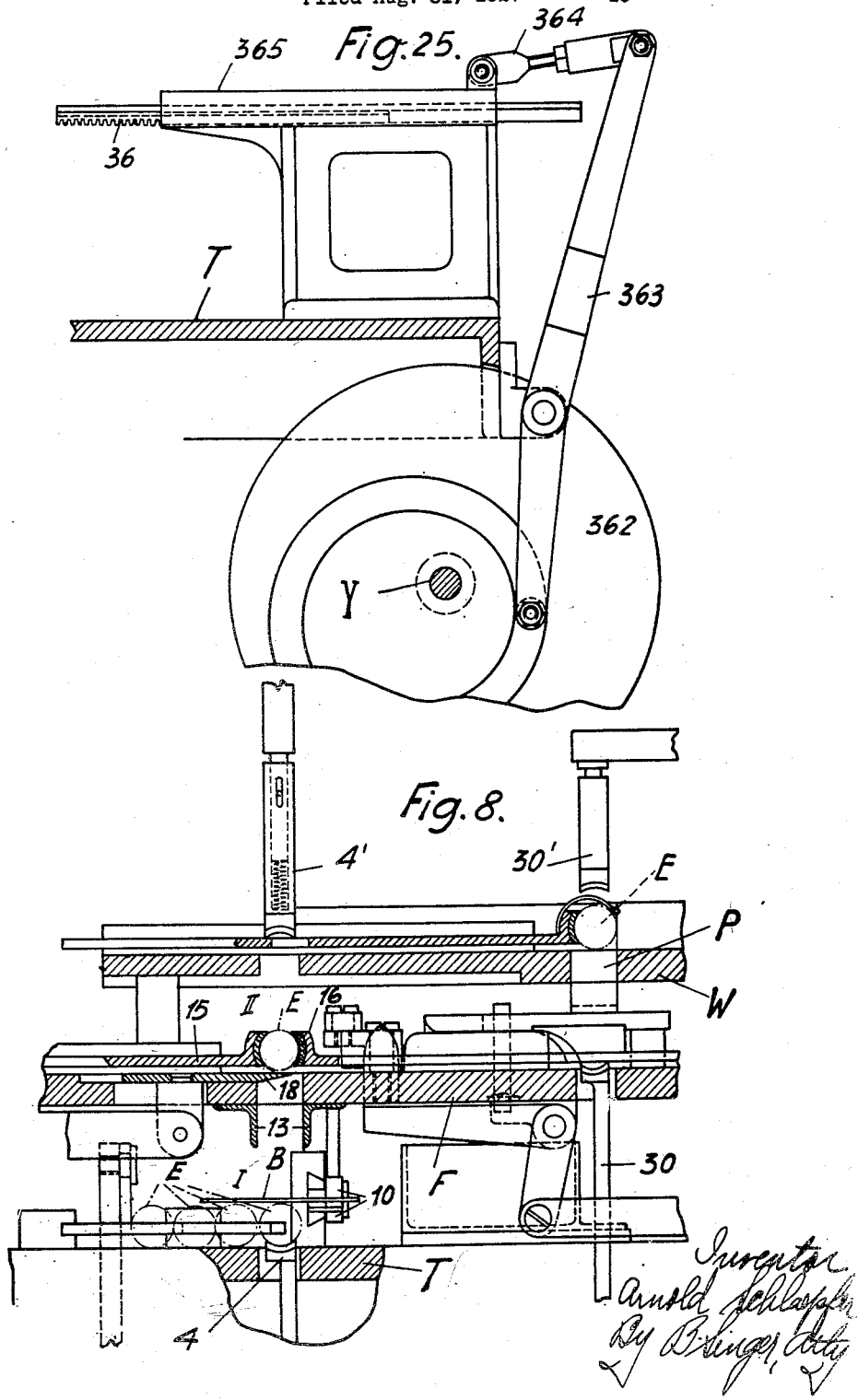

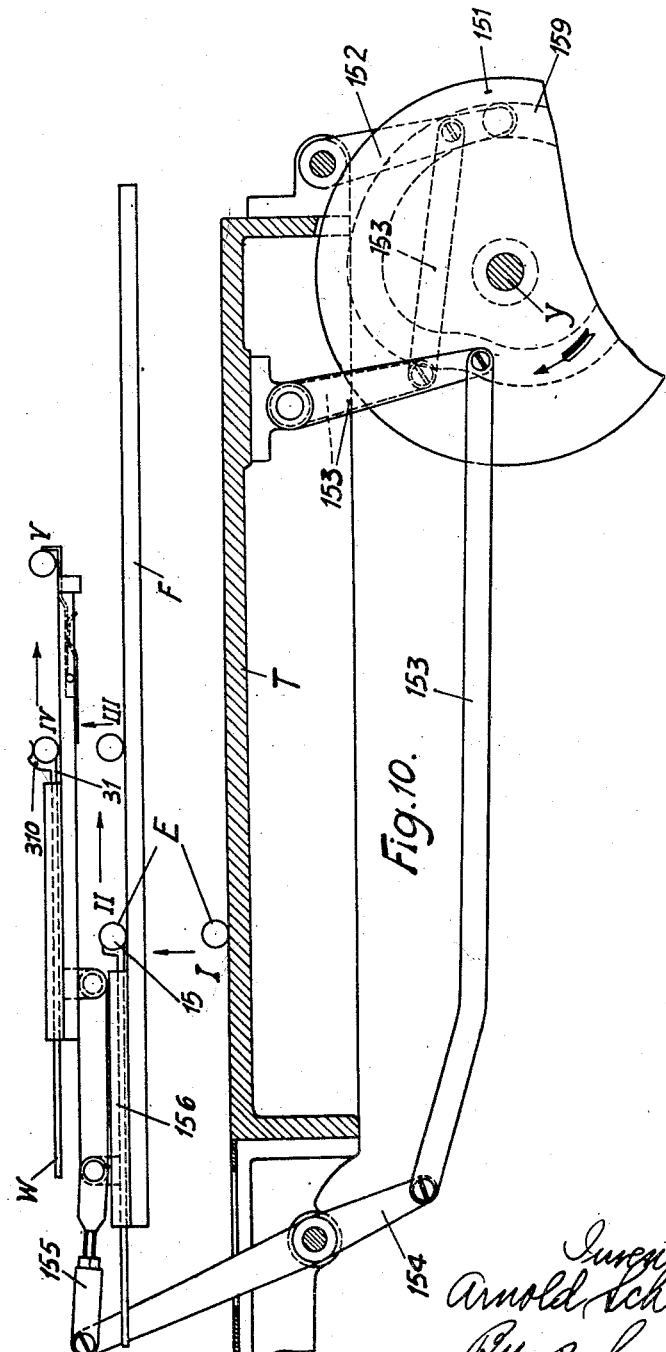

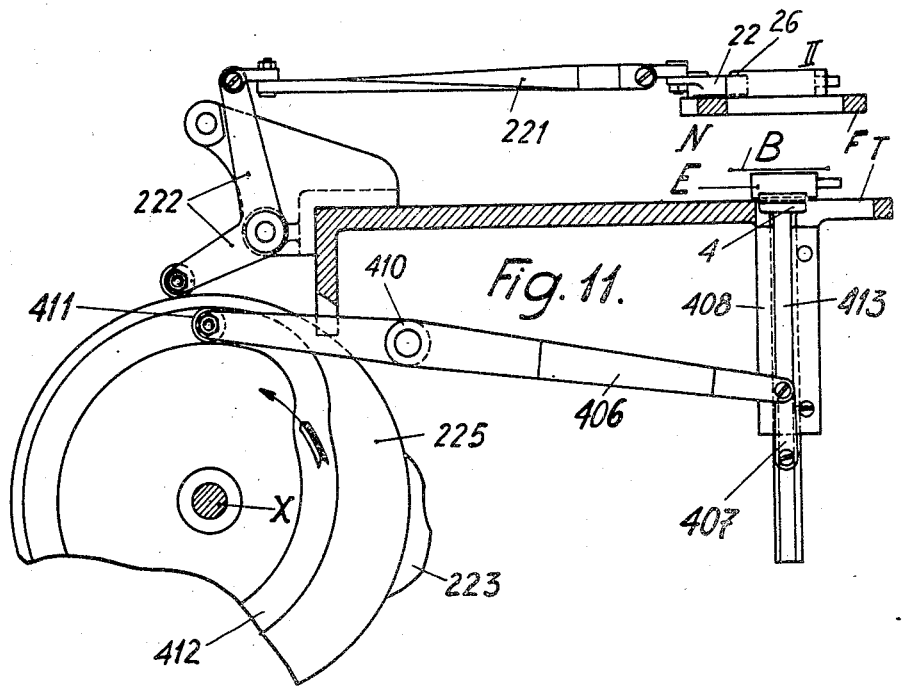
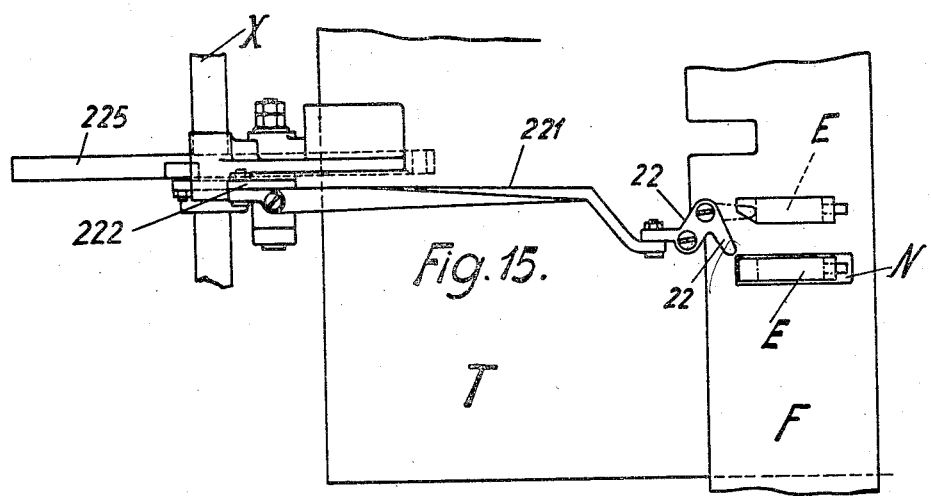

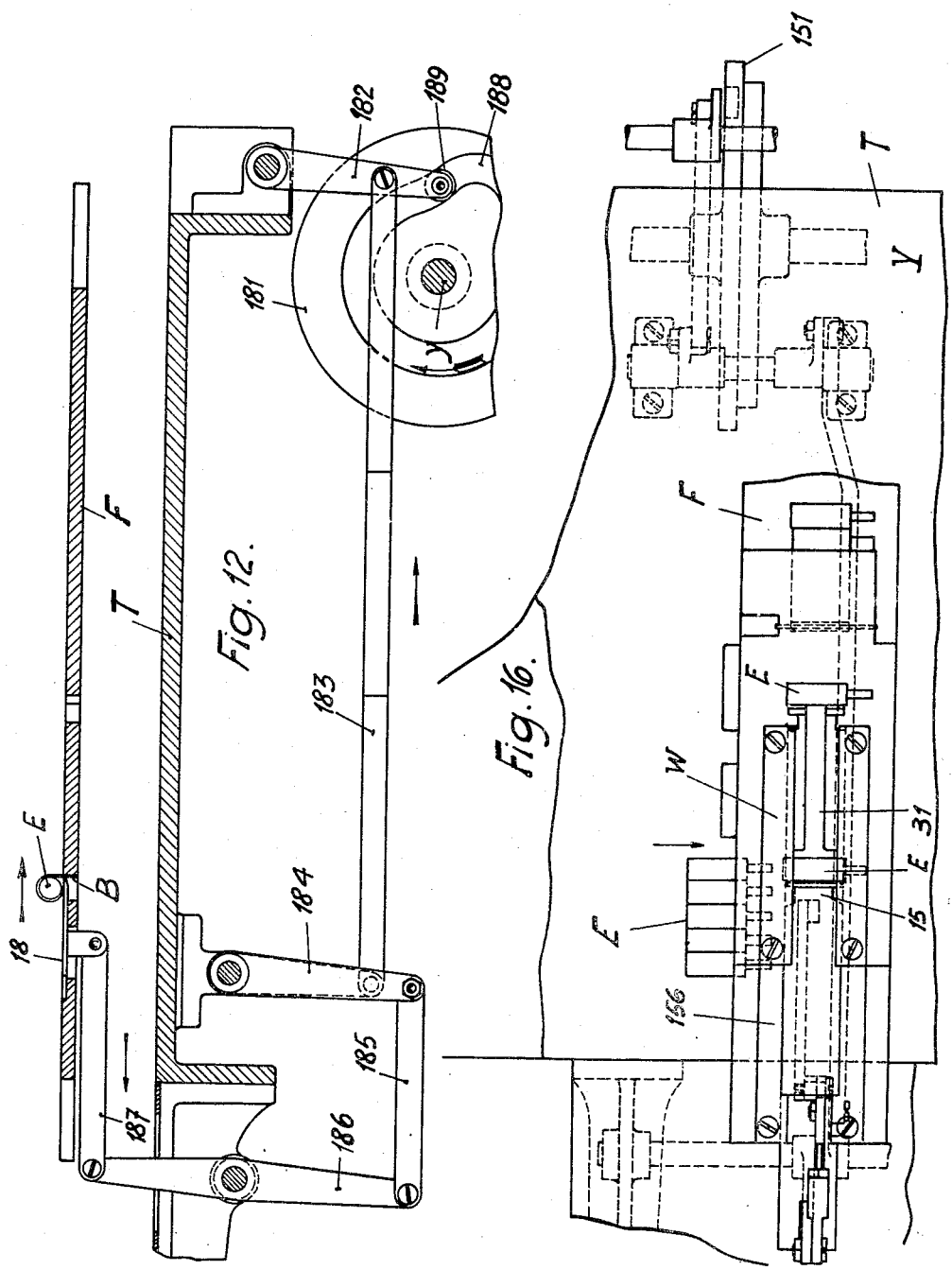

May 31, 1932. A. SCHLAEPFER 1,861,096
MACHINE FOR WRAPPING AND TYING CYLINDRICAL BODIES
Filed Aug. 31, 1927 19 Sheets-Sheet 11
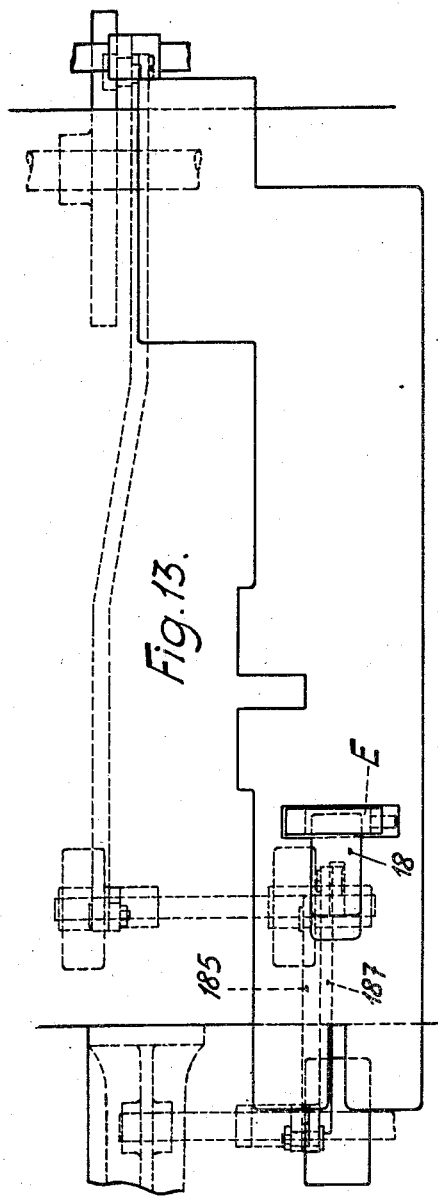
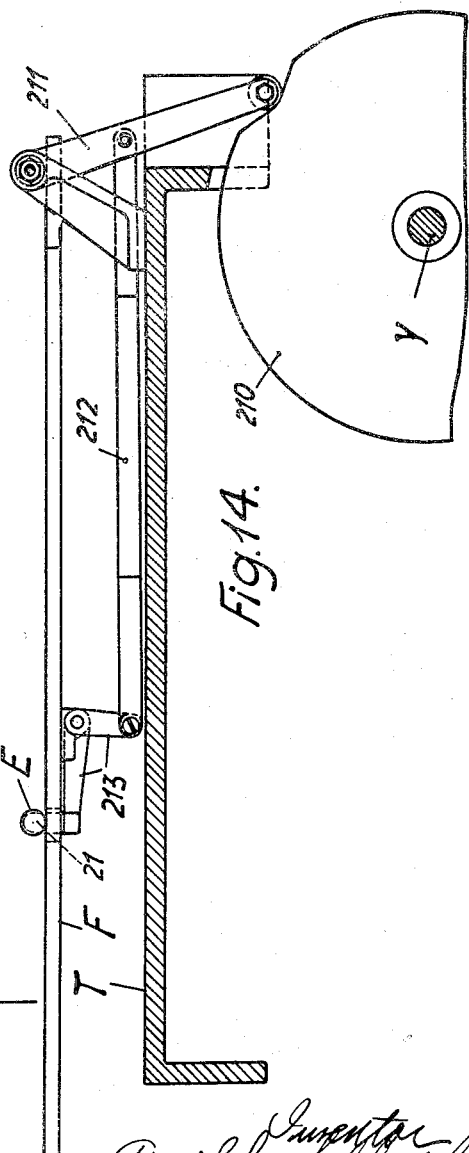

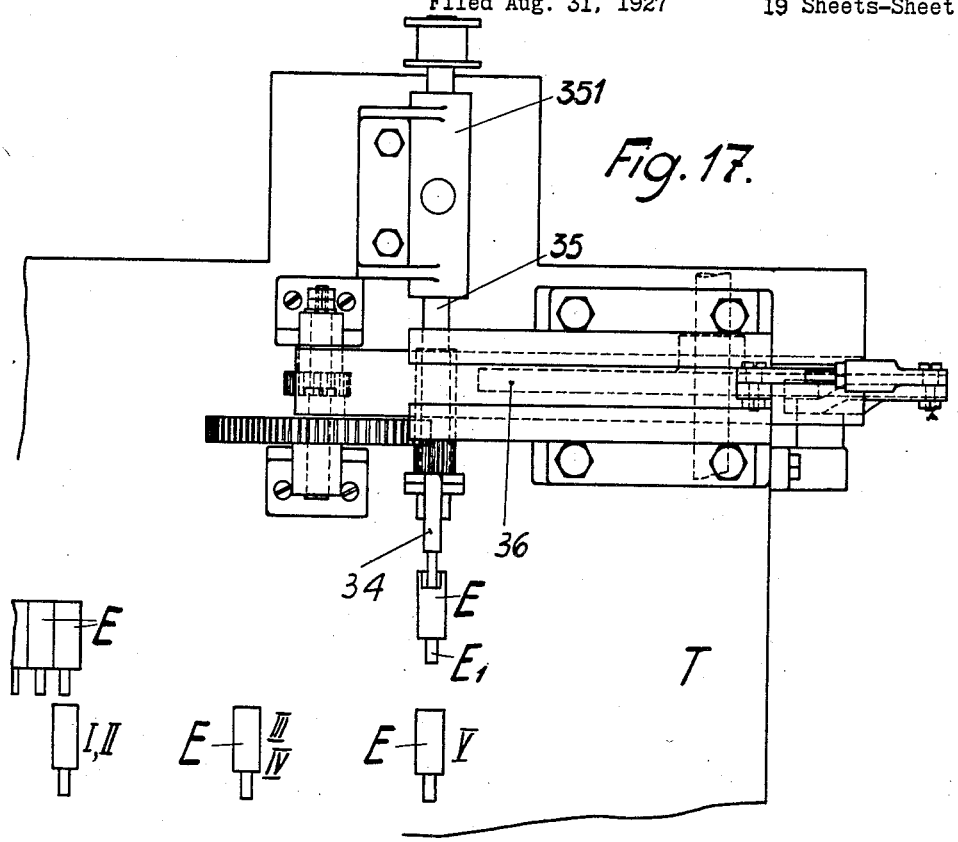
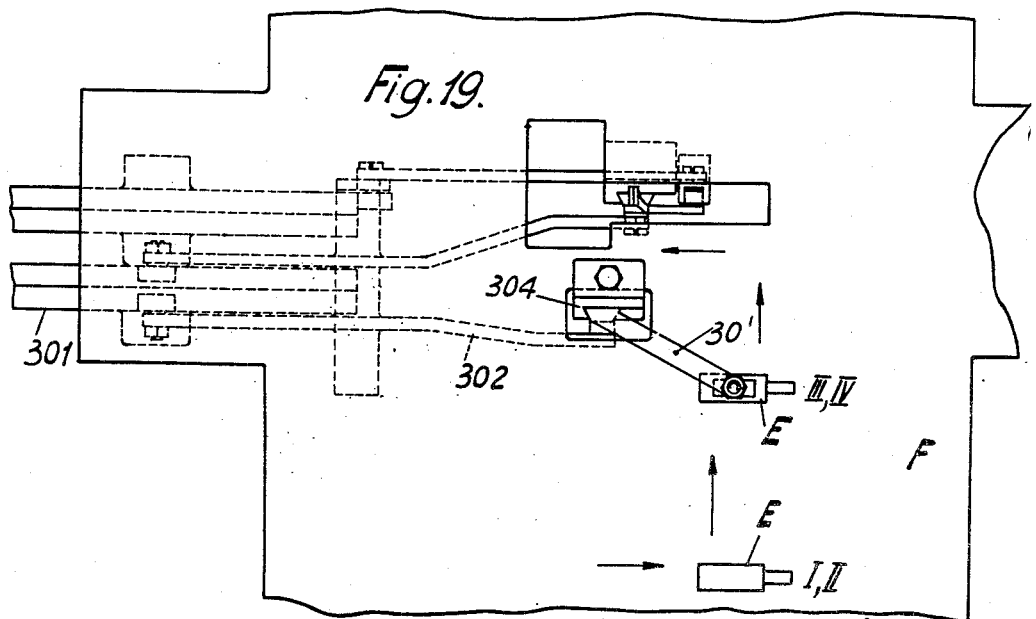

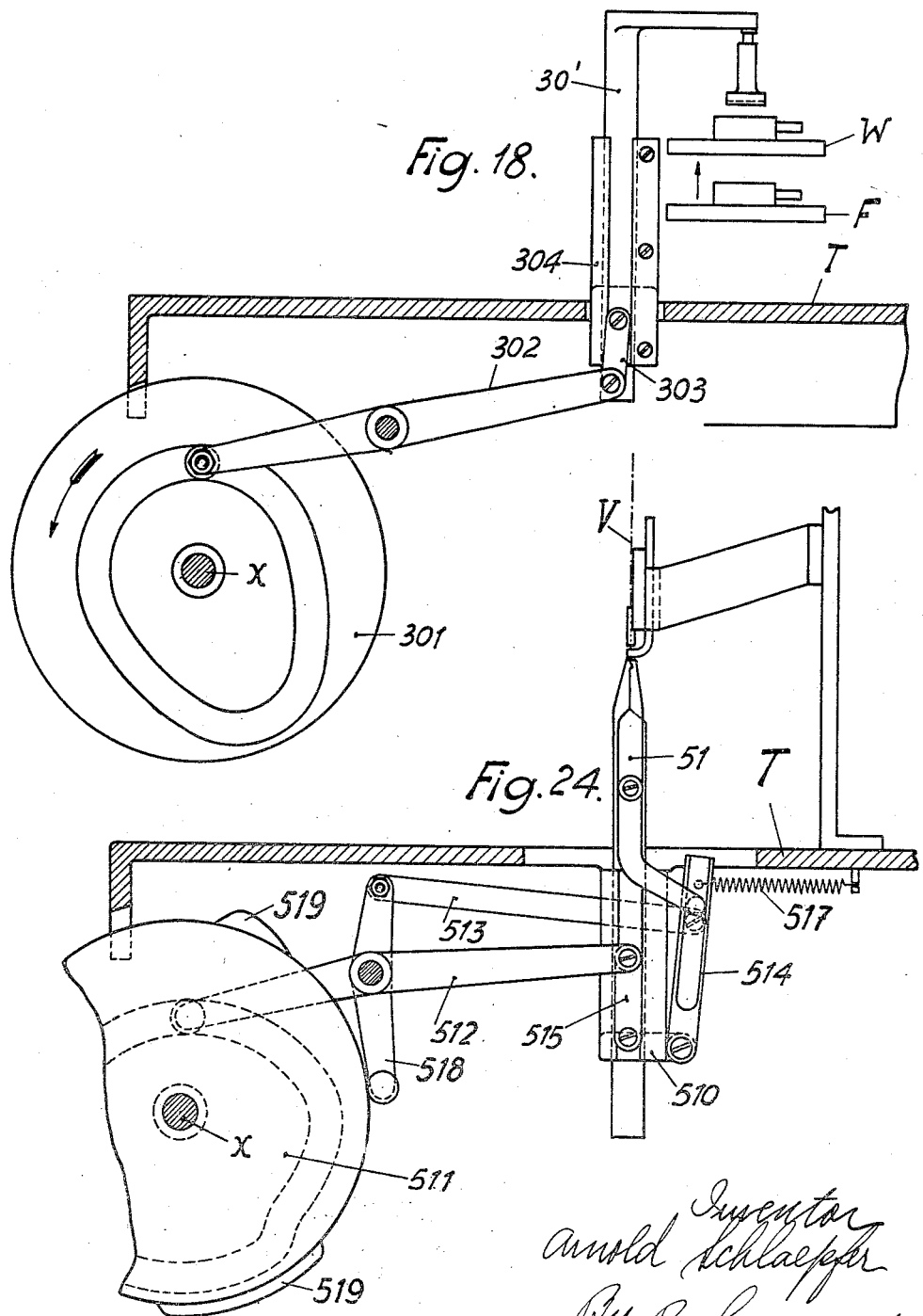

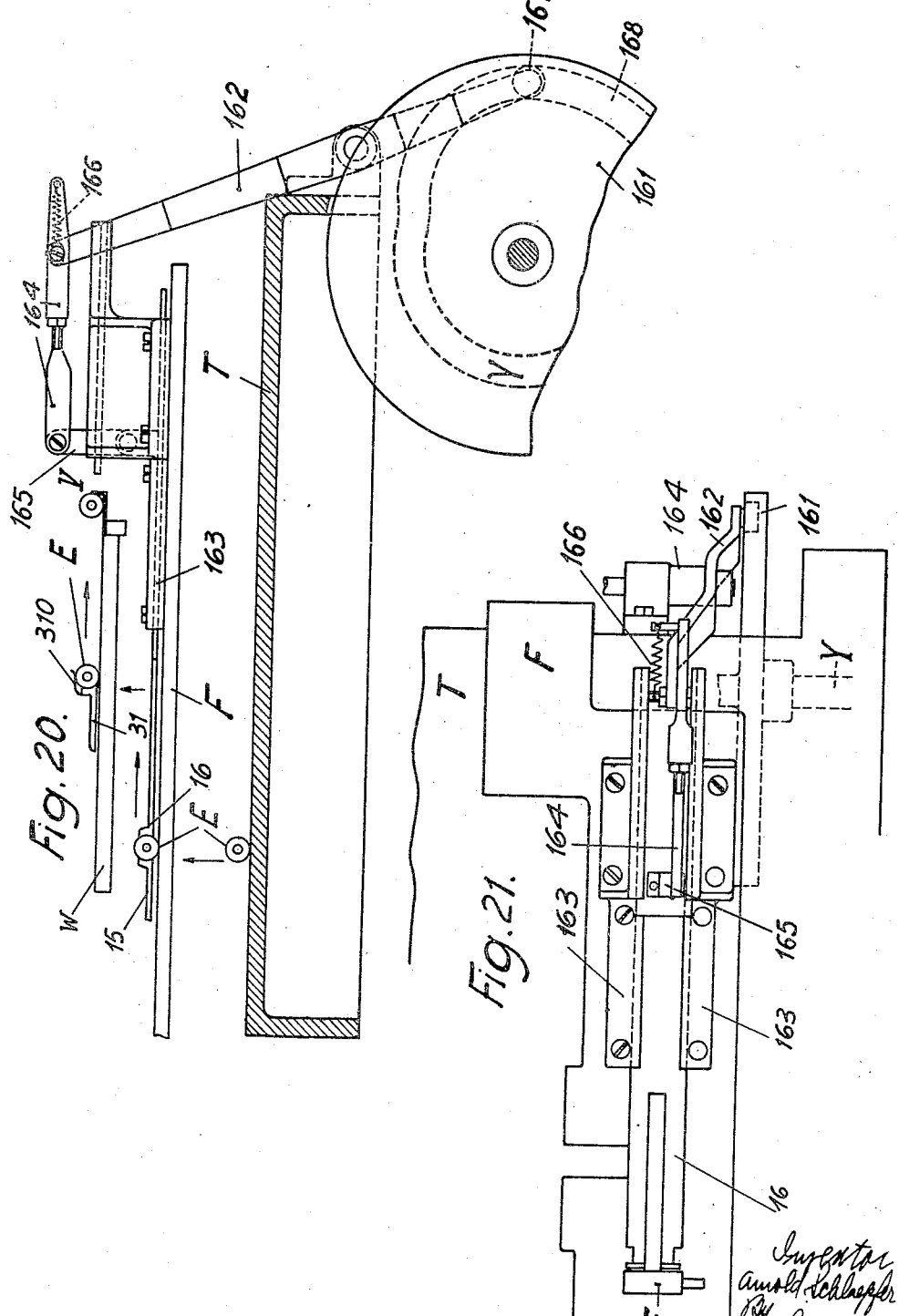

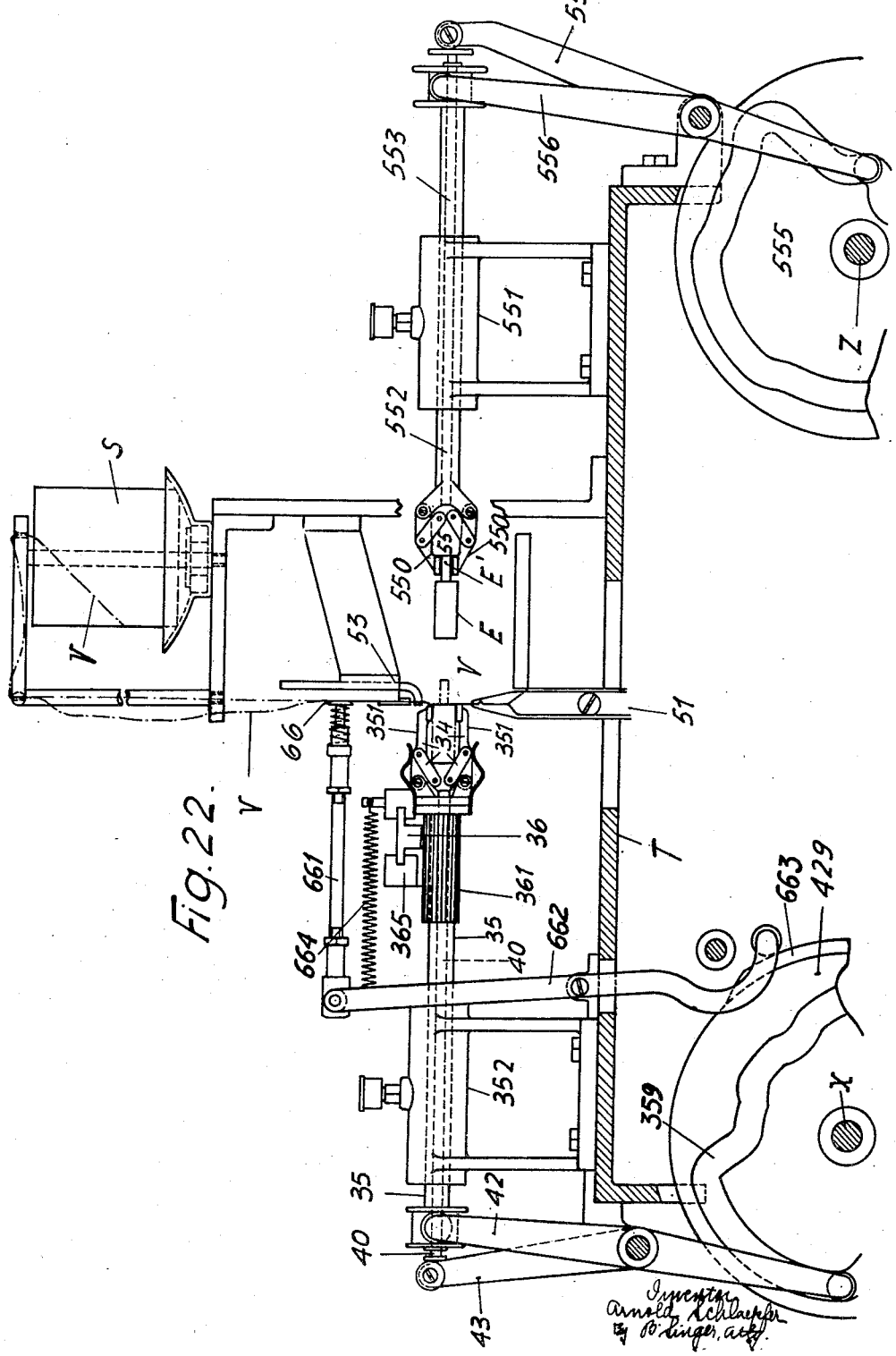

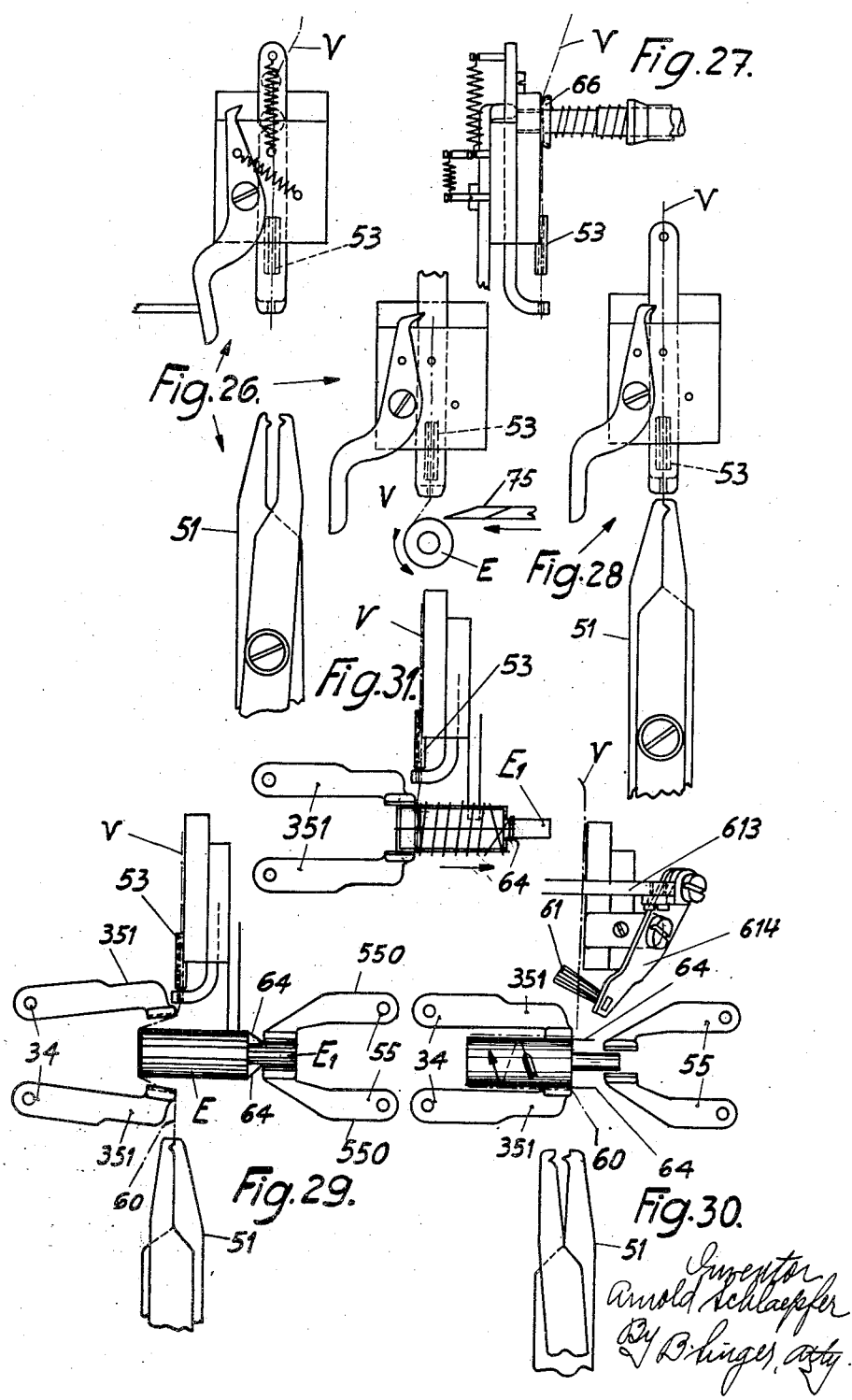

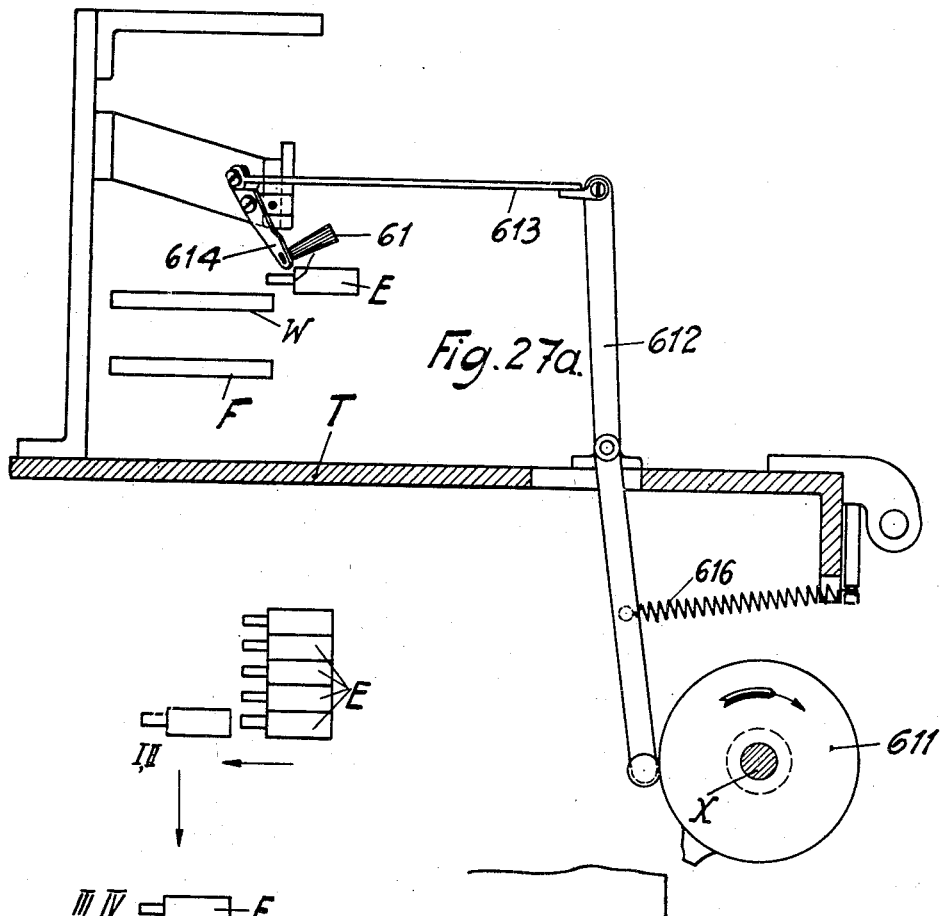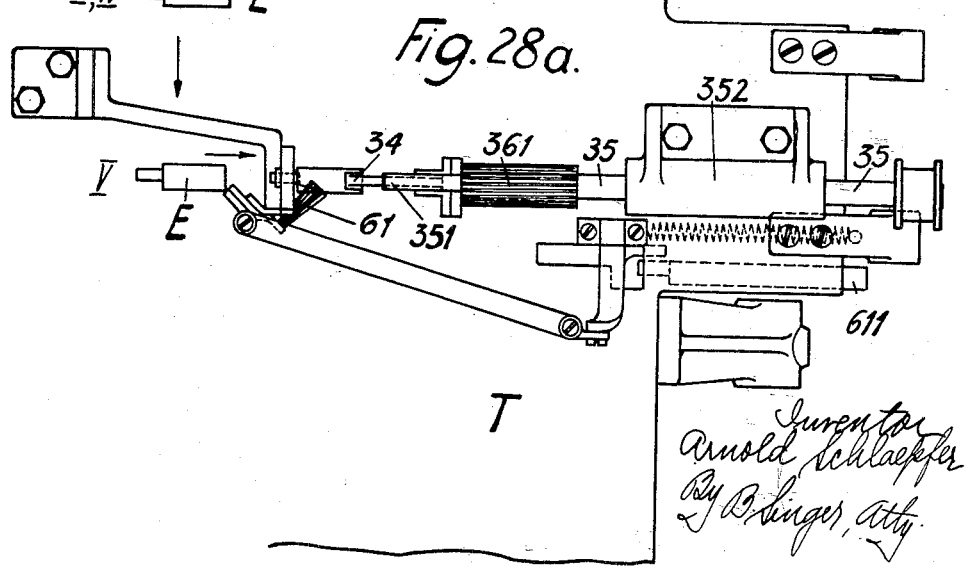

May 31, 1932.  A. SCHLAEPFER  1,861,096
MACHINE FOR WRAPPING AND TYING CYLINDRICAL BODIES
Filed Aug. 31, 1927  19 Sheets-Sheet 18

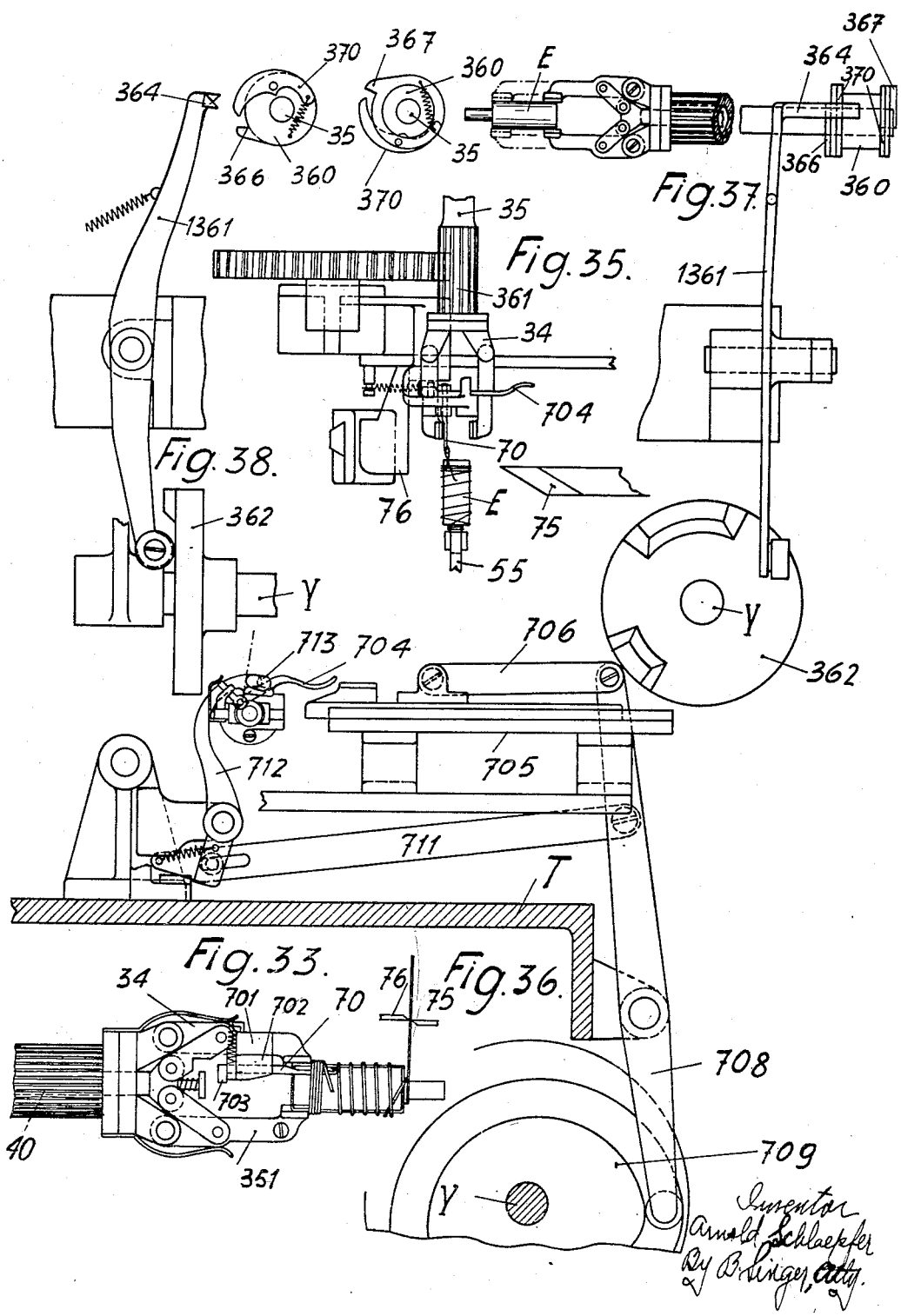

Patented May 31, 1932

1,861,096

UNITED STATES PATENT OFFICE

ARNOLD SCHLAEPFER, OF NEUHAUSEN, NEAR SCHAFFHAUSEN, SWITZERLAND, ASSIGNOR TO SCHWEIZERISCHE INDUSTRIE-GESELLSCHAFT, OF NEUHAUSEN, NEAR SCHAFFHAUSEN, SWITZERLAND, AND LECLANCHÉ S. A., OF YVERDON, SWITZERLAND

MACHINE FOR WRAPPING AND TYING CYLINDRICAL BODIES

Application filed August 31, 1927, Serial No. 216,703, and in Switzerland September 3, 1926.

The present invention relates to a new and improved machine for wrapping small cylindrical bodies such as carbon bodies of electrical dry storage batteries in fabrics and tying it with a string.

The main object of the invention is to provide an automatic machine which will do the work done until now by hand labor. A further object consists in the provision of a machine which will perform the wrapping and the tying exactly, rapidly and with no loss of material.

The invention consists in the means for wrapping cylindrical bodies one by one into pieces of fabric out from a band and in the means for tying with a string, the ends thereof being knotted to keep the wrapping firmly on the body.

A machine embodying my invention consists of the various features, combinations of features, and details of construction hereinafter described and claimed.

In the accompanying drawings a machine is shown in a diagrammatical manner, adapted to wrap and to tie cylindrical bodies having a cylindrical reduced neck on one end.

Fig. 3 is a detail side elevation partly in section.

Fig. 4 is a detail elevation, partly in section, of means to bring the wrapper above the body, to cut a piece of the wrapping material of appropriate shape.

Fig. 5 is a plan of the mechanism shown in Fig. 4.

Fig. 6 is a detail elevation, partly in section, of mechanism including the pair of scissors to cut off the wrapper and the means to operate the same.

Fig. 7 is a plan of the same.

Fig. 8 is a sectional elevation of part of the machine showing the means to bring the body successively to the different positions to be wrapped in and tied.

Fig. 9 is a detail elevation, partly in section, of the means to fold the wrapper and to form a bag thereof.

Fig. 10 is a similar view of the means to bring successively the body into its different positions in which wrapping operations are performed.

Fig. 11 is a side elevation partly in section, of the means to bend the piece of fabric over the body.

Fig. 12 is a detail side elevation, partly in section, of the means to press one edge of said piece of fabric on the body.

Fig. 13 is a detail plan of the same.

Fig. 14 is a detail elevation, partly in section, of the means to press the second edge of said piece of fabric on said body.

Fig. 15 is a detail plan of the means to form a bag of the piece of fabric wound on the body.

Fig. 16 is a similar view of the means shown in Fig. 10.

Fig. 17 is a detail plan of the means to grip the wrapped-in body and illustrates the successive positions of the body with reference to said gripping device.

Fig. 18 is a detail elevation, partly in section, of the means to grasp and to hold the body.

Fig. 19 is a detail plan of the same.

Fig. 20 is a detail elevation, partly in section, of the means to operate the press bars by which the body is held and fed.

Fig. 21 is a detail plan of the same.

Fig. 22 is a detail elevation, partly in section, of the two pairs of tongues alternately gripping the body, the means to operate said pair of tongues and of the device to feed the string, by which the wrapper is tied.

Fig. 23 is a detail plan of the same.

Fig. 24 is a detail elevation, partly in section, of the means to grip the string and to draw it from the spool.

Fig. 25 is a detail side elevation, partly in section, of the means to rotate one pair of tongues while the string is wound on the body.

Fig. 26 is a diagrammatic front elevation of the string guide and gripping device.

Fig. 27 is a detail side elevation of the same.

Fig. 27a is a side elevation partly in section, of the means to bring the end of the string into position while the string is applied to the wrapper.

Fig. 28 is a diagram of the mechanism shown in Fig. 26 in the position in which the string is being caught by the pliers.

Fig. 28a is a detail plan of the mechanism shown in Fig. 27a.

Fig. 29 is a diagram illustrating the relative positions of the body, the two pairs of tongues and of the string feeding parts while the loop is being formed on the body.

Fig. 30 is a similar diagram showing the same parts after the loop has been formed.

Fig. 31 is a similar diagram showing the body and one pair of tongues after the string has been wound thereon.

Fig. 33 is an elevation of the hook to draw the end of the string below winding and associated devices.

Fig. 35 is a detail plan of the body fully wrapped and tied and the position of the string cutter and the pair of tongues.

Fig. 36 is a side elevation, partly in section, of the means to secure the end of the string and the means to operate said device.

Fig. 37 is a detail side elevation of the device to turn the hook catching the end of the string and to draw it below the windings.

Fig. 38 is a detail front elevation of the same.

Figure 1:
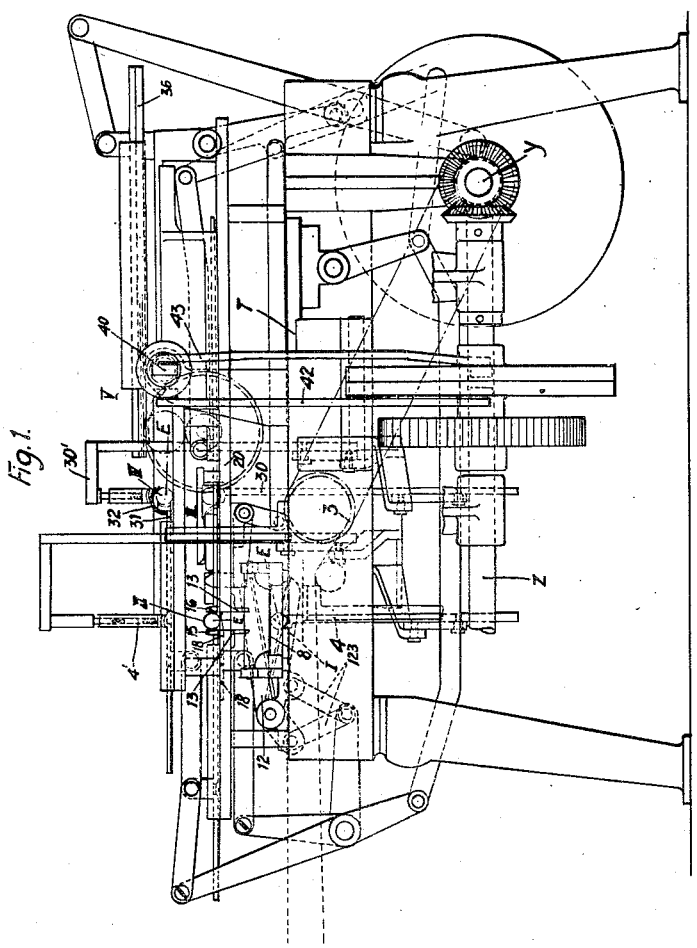
Fig. 1 is a side elevation of the machine.

The automatic machine comprises a table T below which are bearings in which three shafts X, Y, Z, are rotatably mounted. The three shafts are interconnected by bevel gears, two shafts X, Z, are parallel to each other on opposite sides of the table T and shaft Y runs at right angle to the two other shafts. One of the shafts is driven by a suitable motor. The driving means, the transmission means and the bearings are not shown in full in the drawings; they may be made in any suitable manner. To the shafts X, Y, Z, cams are fixed to drive the various elements as described hereinafter.

Figure 2:
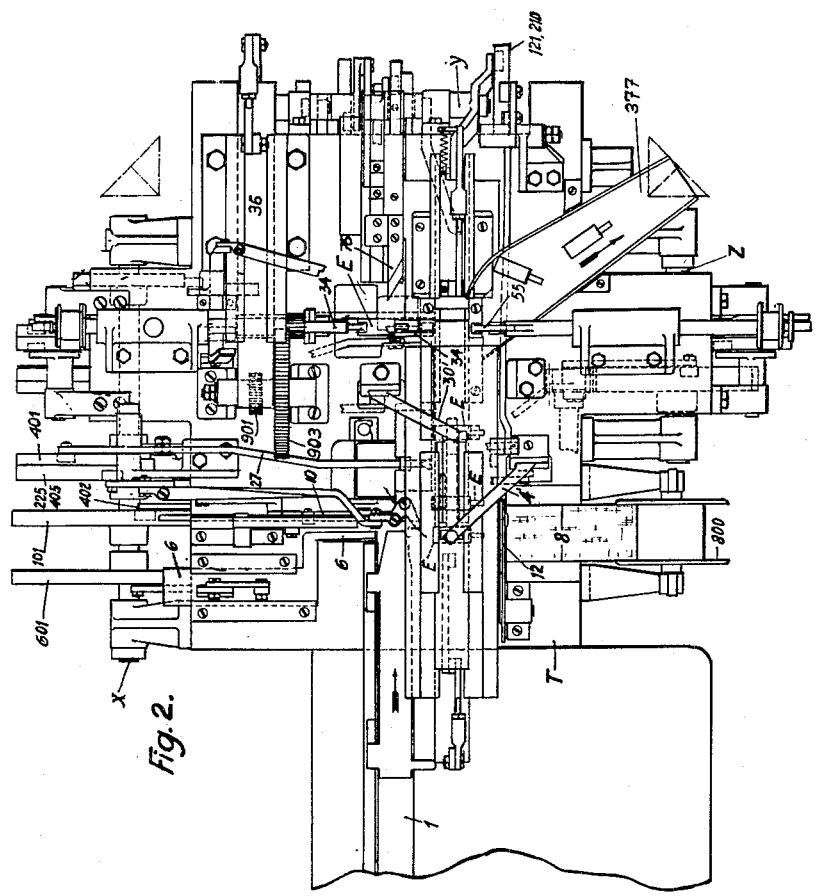
Fig. 2 is a plan thereof.

The bodies E to be wrapped are arranged in a row on an endless belt 1 running over two rollers 2, 3 rotatably mounted on the table T. The belt 1 is driven by suitable means not shown in the drawings it brings the bodies E one by one into position I (Fig. 1) in which the body E is on the level of the top of the table T. A push rod 6 slidably mounted in guides of the table T and running horizontally and at right angle to the belt 1 pushes the body E from the belt 1 on to the table T, as shown in Fig. 3. The body E assumes now the position shown in dotted lines (Fig. 3). The push rod 6 is connected to a two-armed lever 602 by a link 603. The lever 602 is rotatably mounted in a bearing on table T and carries a roller 604 engaging a groove 605 of a cam disk 601 rigidly fixed on the shaft X. On turning shaft X reciprocates the push rod 6 which moves the bodies on top of a jaw 4 in a position denoted in dotted lines in Figs. 2, 3 and in full lines on Fig. 4. The jaw 4 is slidably arranged in vertical guides and co-operates with a second jaw 4' mounted vertically above the jaw 4. The jaws 4, 4' catch the body E as described later on to lift it. While the body E rests on slide 4 and while the latter rests in its lowermost position (Fig. 4) a band 8 of fabric is drawn over the body. Pliers or tongs 10 (Figs. 2, 4 and 5) catch the free end of the band 8 which is coiled on a drum 800 rotatably mounted on the table T. The band 8 is drawn by the said pliers from the drum 800 (Figs. 4 and 5) under a tensioning roller 801 and over a support 802 until the end of the band 8 has passed over the hind end of the body E. As soon as the band 8 has reached this position the pliers stop and by means of scissors 12 (Figs. 2, 5, 6 and 7) an approximately square piece B of fabric is cut off. Figs. 4 and 5 show the parts in the said position; the piece B of fabric rests on the body E and the latter rests on the slide 4 which is itself at rest in its lowermost position. To actuate the pliers a cam is rigidly fixed on the shaft 101 having two lobes 102 and 103. (Figs. 2 and 4.) The said lobes 102, 103 operate a two-armed lever 104, rotatably mounted on the table T which is connected by a link 108 with a grooved guide 110 pivoted on the table. Into the groove of said guide 110 a stud 111 projects fixed to one member 105 of the pliers 10. The latter is opened by the lobes 102, 103 against the action of a spring 109. The pliers may be reciprocated by a two-armed lever 106 of which one arm is linked to the clamping device 10 by means of link 107, the other arm carries a stud engaging a cam groove in the disk 101. The pliers 10 are moved to the right (Fig. 4) in open position until the end of band 8 is between the jaws the device 10 returns now to its initial position drawing the band 8 over the body E and is opened again leaving the band 8 free (Fig. 4). To work the scissors a cam 121 (Figs. 2, 6 and 7) is rigidly fastened on the shaft Y. The cam 121 is provided with a groove 120 into which a stud projects fixed to a lever 122. The latter is pivoted on the table T and is connected by a rod 127 to a bell crank lever 122'. One arm of said lever 122' is connected by two links 123 to the two members 124, 125 mounted on a pin 126 of table T. The band 8 is cut and a piece B of fabric is severed by the cutting means 120 to 126 as soon as pliers 10 have reached their most backward position (Fig. 4). As soon as the piece B has been severed and before the pliers advance again to fetch the band 8 again the two jaws 4 and 4' grasp the body E and the piece B. To this end the jaw 4' is lowered until it rest on the body E. The jaw 4' is operated by a disk 401 (Fig. 9) keyed on shaft X. Into a cam groove 409 of the disk 401 projects a stud fixed to one arm of a lever 402 journaled in the table T.

Lever 402 is connected by a link 404 to a vertical bar 30' slidably mounted in vertical guides 403. On the bar 30' the jaw 4' is fixed by some suitable connecting pieces. As soon as jaw 4' has come to rest on the body E both jaws 4, 4' are moved upwards holding the body E and piece B between them. The jaw 4' is moved by the means described above and jaw 4 by a lever 406 (Figs. 4, 11), pivoted at 410 on table T. A stud 411 on one arm of said lever 406 engages a curved groove 412 in a disk 225 keyed on shaft X. The other arm of lever 406 is connected to the shaft 413 of jaw 4 by a link 407. The jaws 4 and 4' are moved upwards through a hole N of a plate F (Figs. 8, 11) arranged above table T and running parallel thereto. During the upward stroke the body E with the piece B has to pass between two walls 13 which walls turn down the sides of the piece B the latter hanging now on the body E with downwardly projecting edges. As soon as the body E has reached the position II (Figs. 8, 9 and 10) on the level of plate F two press bars 15, 16 running in horizontal guides on the plate F are brought to bear on the body E to hold and arrest the same. As soon as the press bars 15, 16 have got hold of the body E the jaws 4, 4' recede therefrom; the jaw 4' is moved upwards into the position shown in Fig. 8 and jaw 4 returns to its lowermost position below the level of table T to receive a second body E. The press bar 15 is reciprocated by a disk 151 (Fig. 10) fastened on shaft Y. The disk 151 is provided with a curved groove 159 which guides a pin fixed to a lever 152 pivotally mounted on table T. The lever 152 is connected to one arm of a two-armed lever 154 by several links and levers 153. The other arm of lever 154 is connected to the press bar 15 by means of a link 155. The press bar 15 is slidable in guides 156 fixed to the plate F. The press bar 16 which is slidably mounted between guides 163 (Figs. 20, 21) is connected by links 164, 165 and by a spring 166 to the one end of a lever 162 pivotally mounted on table T. A pin 167 on said lever 162 engages a cam groove 168 of the disk 161 which is fast on shaft Y. The spring 166 compensates for certain inaccuracies in the dimensions of the parts and ensures a firm hold of the body E in all cases. While the body E with the piece B on it being firmly held by the press bars 15, 16 one of the edges of the piece B hanging vertically down from the body E is folded over the body by a slide 18 (Figs. 8, 12, 13). The slide 18 is slidably arranged in a recess of plate F and is connected to a lever 186 by a link 187.

The lever 186 is pivotally mounted on table T and is connected by links 183, 185 and swing levers 184 to a lever 182 rotatably mounted on a stud of table T. A pin 189 fixed on lever 182 engages a groove in the disk 181 fastened on the shaft Y and the front edge of the slide 18 lifts the left hand edge of piece B (Figs. 8, 12) into a horizontal position and retains it in the said position while the two press bars 15 and 16 jointly are moved in horizontal direction taking the body E with them. The right hand edge of the piece B is now folded over the other edge of the piece of fabric as the body E passes over the hole N in plate F. The body E is now fully wrapped about the piece B. The partially wrapped body is arrested at the position marked III (Fig. 10).

The piece B projects over the lower end of the body E (Fig. 9). The projecting portion of the wrapper is to be folded down on the face of the body to form a bag. A first folder 21 (Fig. 14) is moved up and down through a slot in the plate F by a lever 213 which is connected to a lever 211 by a link 212. The free end of lever 211 rides on a cam 210 fastened to a shaft Y. On rotation of shaft Y the folder 21 is moved up in front of the lower face of the body E and the piece of fabric is folded. A second folder 22 (Figs. 11 and 15) moving in horizontal direction presses now another projecting portion of the wrapper B on to the face of body E. The folder 22 forms a small angular lever rotatably mounted on a stud of the plate F at such a distance from the body that the free end of the lever 22 just passes over the face of body E thus pressing the fabric closely thereto. The lever 22 is linked by a rod 221 to a two armed lever 222 pivotally mounted on table T. One arm of said lever running on a disk 225 fixed to shaft X is operated by a cam 223.

A third folder being and working exactly alike the folder 22 and having alike driving means now makes the third fold, working in opposite direction to the folder 22. The third folder is not shown in the drawings to simplify the drawings. A horizontal flap 26 (Fig. 9) remains to be folded. On to flap 26 projecting over the face of body E gum or other sticking material is applied by a lever 27. The lever 27 is rotatably mounted in a bearing of table T, the one arm 272 of said lever runs on a cam 273 fixed to shaft X lifting the other arm up and down. The fore end of lever 27 projects in a container 29 of liquid gum and takes some of the gum to deposit it on the under side of the flap 26.

The body E is now again grasped by a pair of jaws 30, 30' which lift the body out of position III into a position IV (Fig. 10). When going upwards the body passes close over a bar 24 and this bar 24 presses now the last flap 26 down on the three other flaps laying on the face of body E. The flap 26 adheres now firmly on said flaps and the body E is encased in a bag of fabric. The jaws 30, 30' (Figs. 18, 19) are operated in the same manner as the jaws 4 and 4' from the respective shaft X and Z by the cam disk 301, lever 302, link 303 slide 30'. The means to operate jaw 30 are not shown they correspond in every respect to the means (406, 407, 411, 412) to operate jaw 4 (Fig. 11).

The body E held between the jaws 30, 30' is now lifted through an opening P on to a table W (Figs. 8, 10, 18) and as soon as it reaches the upper level thereof it is caught by a slide 31 having curved blade springs 310 adapted to pass over the body E and to hold it after the jaws 30, 30' have released the body E. The springs 310 grip the body E loosely in its middle portion, both ends thereof are free. The jaws 30, 30' return to their respective initial position and the slide 31 pushes the body E in a horizontal path into the position denoted by V (Figs. 10, 17, 20). In the position V a string is wound round the body E within the bag B' and the ends of the string are secured.

The body E passes between jaws 351 of tongs 34 (Figs. 17, 22, 23) and alternately between jaws of second tongs 55 (Figs. 2, 22) the tongs 34 and 55 cooperate in rotating and moving the body alternately and in proper sequence to wind a piece of string on the body in a predetermined manner.

First the body E is caught by the tongs 55, the jaws 550 thereof (Fig. 22) grip the reduced end or neck E' of body E. The jaws 550 are pivoted on the end of hollow shaft 552 which is arranged rotatably and slidable in a bearing 551 fixed to table T. Between two annular flanges on said hollow shaft 552 (Fig. 22) the free end of a lever 556 projects which lever is governed by a cam disk 555 fastened to shaft Z. Within the hollow shaft 552 a rod 553 is rotatably and slidably mounted, one end of said rod is connected by links to the jaws 550 the other end of rod 553 is linked to a lever 557 actuated by a cam groove in the disk 555. The rod 553 opens and closes the tongs 55 to catch and to release the body E; the jaws 550 grip the wrapper B and press it on the neck $E_1$ as shown in Fig. 29.

While the body E is held by the tongs 55 a piece V of string is drawn in front of and close to the face of body E (Figs. 22, 24, 26, 28, 29). The string V is drawn from a spool S (Fig. 22) by pliers 51. The string passes through a guide 53 and through a friction brake 66 which keeps the end piece of the string V taut. The pliers 51 are moved up and down in vertical guide ways 510 by a lever 512 which is connected to a shaft of one member of the pliers by a link 515 and which engages a curved groove in a disk 511 by a pin. The disk 511 is fastened to the shaft X and is provided at its circumference with cams 519 which actuate by means of a lever 518 and a link 513 the second member of the pliers 51 by means of a grooved lever 514. The said second members of the pliers engages the groove of lever 514 by means of a pin slidably arranged in said groove. The pliers 51 are moved up and down by the elements 511, 512, 515 and in any position the pliers may be opened and closed by the elements 511, 518, 519, 513, 514. The pliers 51 are first moved upwards up to the guide 53 and are opened there (Fig. 24). The pliers 51 grasp there the free end of string V, they are closed again and are moved downward rather much below the body E (Figs. 22, 29). The pliers 51 are then arrested at their lowermost position holding the string V. A spring 517 tends to close the pliers 51.

The brake 66 for the string V comprises a foot (Fig. 22) pressing the string V against a counterplate covered with felt or like material. The foot rests on a coiled spring of a rod 661 linked to a lever 662 which is operated by cams 663 of a disk 429 fixed to shaft X (Fig. 22). A spring 664 keeps lever 662 in contact with said disk 429.

The pliers 51 with the string V between the jaws are held at rest at their lowermost position and the string V is held by the brake 66, 53 at the upper end. The body E is now moved by the tongs 55 in horizontal direction (Figs. 29, 30) until body E together with the string is well between the jaws 351 of tongs 34 (Fig. 22). The friction brake 66 allows the string V to slip but the end piece is kept taut and the string is drawn tight on the body E. As soon as the body E has reached the position shown in Figs. 22 and 30, the tongs 34 close, the tongs 55 open, the latter return to their initial position to receive another body E. At the same time the pliers 51 release the string V.

The tongs 34 comprises two jaws 351, adapted to get hold of the body E within the wrapper and of the string (Fig. 30). The jaws 351 are pivoted on the one end of a hollow shaft 35, blade springs fixed to the shaft 35 and acting on the jaws tend to close the tongs 34. At the other end the hollow shaft 35 which is journaled in a bearing 352 is provided with two annular flanges. A pin fixed to a lever 42 projects between the flanges, the lever 42 which is pivotally mounted on the table T engages with a pin a curved cam groove 359 of the disk 429 fixed on shaft X. By means of this disk the shaft 35 may be moved to and fro in its bearings 352. Within the hollow shaft 35 a rod 40 is slidably mounted. One end of said rod is connected to the jaws 351 by means of links, the other end of rod 40 is linked to a lever 43 which is operated by a cam groove in the disk 429. The rod 40 opens and closes the tongs 34 in a predetermined manner. The shaft 35 has to be rotated to wind the string V on the body and to effect this a long pinion 361 is fixed to the shaft 35. A rack 36 drives by means of an intermediate toothed gearing 901, 902 a spur wheel 903 which is in engagement with the pinion 361 (Figs. 17, 22, 25). The rack 36 which is slidable in guides 365 of the table T is connected to a lever 363 by a link 364 (Fig. 25). The lever 363 is pivotally mounted on the table T and carries at its lower end a pin which engages a groove in the disk 362 rigidly fastened to shaft Y. The rack 36 is moved to and fro and thereby rotates the shaft 35 with the tongs 34 and the body E. The tongs 34 may be turned either way and simultaneously displaced axially in either direction by the lever 42. The tongs 34 are closed by the rod 40 as soon as the jaws 351 have attained the position shown in Fig. 30, the neck $E_1$ projecting beyond the jaws 351.

The tongs 34 with the body E are now rotated twice without any axial displacement of the tongs 34. Two windings of the string V are laid on the neck $E_1$. The end piece 60 of the string V is brought to lay flat on the neck E by a small bundle of bristles 61 fastened to a lever 614 (Figs. 27a, 28a, 30). The lever 614 (and therewith the bristles 61) is moved to and from the body E by means of a cam disk 611 fastened on shaft X which actuates a lever 612. The latter is connected to the lever 614 by rod 613. A spring 616 keeps the lever 612 in engagement with the cam 611. The end piece 60 is firmly held on the neck $E_1$ by the two windings made subsequently to the pressing down of the piece 60 on the neck, and can not work loose. Moreover the wrapper B is now secured on the body, the projecting portion 64 of the wrapper being tied down on the neck by the said two windings of the string.

Immediately after the two windings have been made the body E is again gripped by the tongs 55, the prongs 34 being opened and returned, leaving the body E free to rotate together with the tongs 55 and the revoluble shaft 553. While rotating the tongs 55 and therewith the body E are moved in horizontal direction to the right (Figs. 22, 23) in such a manner that the string V is wound helically on the body E (Fig. 31).

The axial displacement of the body E and the tongs 55 is stopped as soon as the coils of the string come near the end of body E. The tongs 34 are brought on to body E and are closed gripping the body E, at the same time the tongs 55 are opened and moved away from the body E. The tongs 34 rotate three times without any axial displacement and three windings are formed close to each other and close to the bottom of body E (Fig. 34).

Figure 32A:
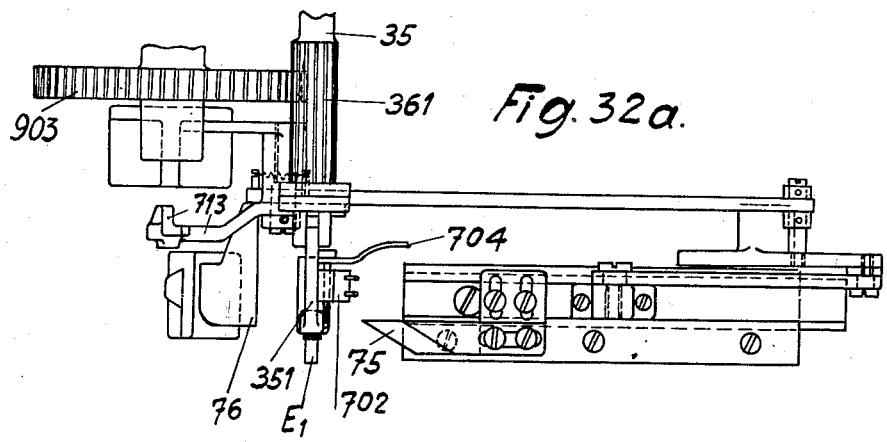
Fig. 32a is a detail plan of the same.
Figure 33A:
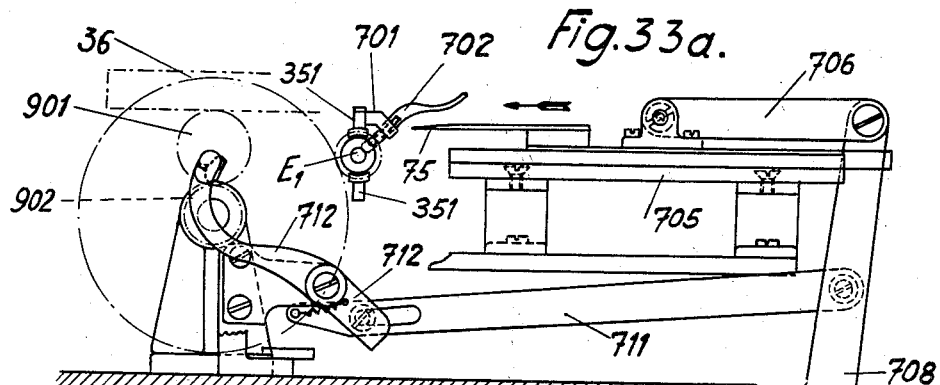
Fig. 33a is a side elevation, partly in section, of the means to operate the means to cut the string and to operate the hook.
Figure 34:
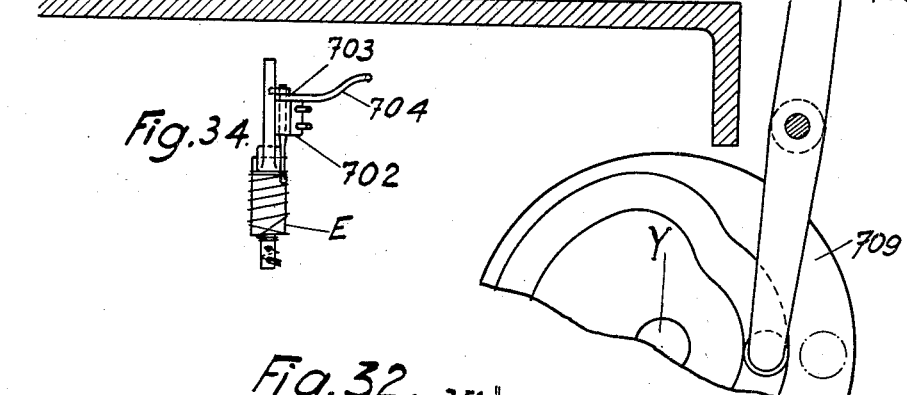
Fig. 34 is a detail elevation of the means to operate the hook.
Figure 32:
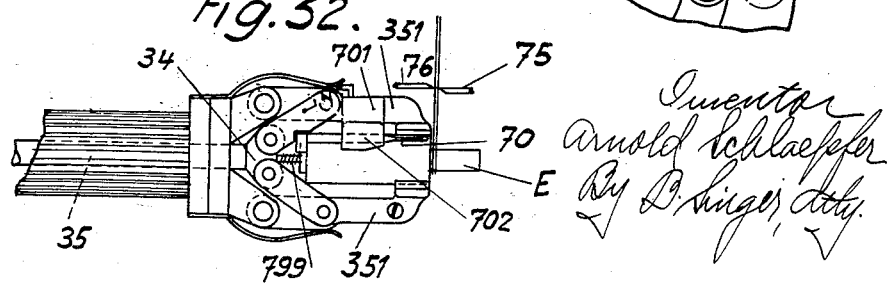
Fig. 32 is a detail side elevation of the cutting device for the string, the device operating same and the means to hold the body.

Immediately before the said last three windings or coils are produced a small hook 70 is put on the body E in such a manner that the three windings pass over said hook 70 (Figs. 32, 33, 34). The hook 70 has to catch the end of the piece of string V which is wound on the body E and after it has been severed (as described hereinafter), and to draw it beneath the said three windings to have it secured.

The hook 70 is slidably and rotatably arranged on a jaw 351 of the tongs 34 (Figs. 31, 32, 33) and is housed in an extension 701. In said extension 701 a holder 702 is mounted. The holder 702 comprises two parallel studs engaging bores of the extension 701 arranged radially to the body E. In this holder 702 the cylindrical shaft of the hook 70 is slidable in the direction of its axis. The rear end of the hook shaft is provided with a head 703 and with an arm 704 rigidly fixed thereto. A spring 799 (Fig. 32) acting on the hook 70 tends to hold or to return the hook 70 in and to the position shown in Fig. 34 in which the head 703 rests on the face of holder 702. The hook 70 is rotated about its axis by means of arm 704. The head 703 projects in the path of the body E and hence the hook 70 is moved backwards in the tongs 34 against the action of spring 799 as soon as a body E is fully inserted in said tongs 34 (Fig. 32). If the tongs 34 hold the body E at its rear end only (Figs. 31, 33) the spring contracts and the hook 70 is drawn forwards projecting beyond the end of jaw 351 (Fig. 33). In this position of hook 70 the above said three windings forming a plurality of binding coils are wound on the body E over the hook 70. Before the three windings are fully made the hook 70 which lies flat on the wall of the body E that is on the wrapper is turned about its shaft for about 90° in such a manner that the hook proper stands upright, in such a position that the string V may enter the opening of hook 70.

Moreover before the three windings are fully made but immediately after the hook 70 has been turned up the tongs 34 are moved in axial direction for but a small distance in such a manner that the string enters the hook 70. At the same time the piece of string wound on body E is severed by a shear 75, 76. The body E is again caught by the tongs 55 while the tongs 34 are opened. The tongs 55 are moved to the right (Fig. 22) and the hook 70 (which is held by the tongs 34) draws now the free end of the string under the binding coils consisting in the three windings aforesaid (Fig. 35).

To turn the hook 70 about the axis of its shafts and to operate the shear to sever the string a disk 709 is fixed to the shaft Y. A lever 708 engaging with a pin a curved groove in the said disk 709 is connected by a link 706 with a shear-blade 75 slidably mounted in the guide-ways 705. The cutting edge of the blade 75 co-operates with a stationary blade 76 to cut the string. The lever 708 actuates moreover a two-armed lever 712 pivotally mounted in the frame of the machine by means of a connecting rod 711. The upper arm 713 of said lever 712 co-operates with the arm 704 fixed to the shaft of hook 70, and turns the latter in the pre-cited manner and for the object stated (Figs. 32a, 33a and 36). The hook 70 after it had been turned up to receive the string is again turned down and lies flat on the mantle of the body E pressing the free end of the string on said mantle. By these means the end of the string V cannot leave the hook and is drawn under the bond.

To get the co-operation of the arm 704 and lever 712 in the desired manner it is essential that the prongs 34 are in the proper relative position with reference to the lever 712 (Figs. 32, 33). To attain this a stop device is arranged shown in Figs. 37, 38. The stop device comprises a sleeve 360 fixed on shaft 35 and a stop lever 1361 which is pivotally mounted in the frame of the machine. Lever 1361 is actuated by a cam disk 362 keyed to shaft Y and is provided at its upper end with a finger 364. The finger 364 may be brought in and out of the path of two noses 366, 370 on the sleeve 360, in such a manner that the shaft 35 and therewith the prongs 34 can be stopped in whatever direction the shaft 35 turns. Near each nose 366, 370 a small two-armed lever 370 is pivotally mounted on sleeve 360. One arm of said lever 370 is pressed outwards by a spring. On stopping the shaft 35 the finger 364 presses first on one of the levers 370 according to the direction the shaft 35 runs. The friction produced thereby brakes the shaft 35 and the nose 366 strikes but feebly on the finger 364.

The body E being now fully wrapped and tied is now released by the tongs 55 and falls down through a chute 377.

What I claim and wish to secure by U. S. Letters Patent is:—

1. The process of wrapping a cylindrical body having a reduced neck at one end consisting in placing a piece of string across the bottom of the body longitudinally over the side-walls, forming several windings of the string around the said neck and thereby firmly securing one end of the string making several windings on the mantle portion of the body and making a bond winding near the bottom end of the body, and securing the other end of the string by said bond winding.

2. A machine for wrapping cylindrical bodies with fabric, comprising a slide, means to bring the bodies one by one on said slide, means to bring a piece of fabric above the body on the slide, a second slide cooperating with the first said slide to grip the said body with the fabric thereon, means to cause said slides to lift said body, means to fold over the edges of the piece on the body, means to lead a string on to the body and means to wind a string on the body wrapped in the piece of fabric comprising two prongs adapted to grip the body and to turn and move it in the direction of its axis and relative to the means to lead the string and means to secure the free end of the string to prevent the loosening of the tie, the last said means comprising a hook, adapted to catch the end-piece of the string and to pass it below a binding coil.

3. In a machine to wrap by a string, a cylindrical body having a reduced end portion in a piece of fabric, means to wrap the body in a rectangular piece of fabric, means to fold the end portion of the wrapper to obtain a bag containing the body, means to form a loop in said string axially of the body and means to secure the folds on the face of the fabric and to form several windings on the reduced neck portion to firmly secure one end of the string and the piece of fabric, and several windings on the mantle portion of the body, and a binding coil near the bottom end of the body, by which binding coil the other end piece of the string is secured.

4. A machine for wrapping cylindrical bodies with fabric, comprising a slide, means to bring the bodies one by one on said slide, means to bring a piece of fabric above the body on the slide, a second slide cooperating with the first said slide to grip the said body with the fabric thereon, means to cause said slides to lift said body, means to fold over the edges of the piece on the body, means to lead a string on to the body, and means to wind a string on the body wrapped in the piece of fabric comprising two prongs adapted to grip the body, and to turn and move it in the direction of its axis and relative to the means to lead the string.

5. A machine for wrapping cylindrical bodies with fabric, comprising a slide, means to bring the bodies one by one on said slide, means to bring a piece of fabric above the bodies on the slide, a second slide cooperating with the first said slide to grip the said body with the fabric thereon, means to cause said slides to lift said body, means to fold over the edges of the piece on the body, means to lead a string on to the body, and means to wind the string on the body wrapped in the piece of fabric comprising two prongs adapted to grip the body, and to turn and move it in the direction of its axis and relative to the means to lead the string and means to secure the free end of the string by drawing said free end below the windings of the string.

6. A machine for wrapping cylindrical bodies with fabric, comprising a slide, means to bring the bodies one by one on said slide, means to bring a piece of fabric above the body on the slide, a second slide cooperating with the first said slide to grip the said body with the fabric thereon, means to cause said slides to lift said body, means to fold over the edges of the piece on the body, means to lead a string on to the body and means to wind the string on the body wrapped in the piece of fabric comprising two prongs adapted to grip the body and to turn and move it in the direction of its axis and relative to the means to lead the string and means to secure the free end of the string to prevent the loosening of the tie, the said last means comprising a hook, adapted to catch the end piece of the string and to pass it below a binding coil, tongs on which said hook is mounted, said tongs being operated by a cam actuated lever for operating said hook.

7. A machine for wrapping cylindrical bodies with fabric, comprising a slide, means to bring the bodies one by one on said slide, means to bring a piece of fabric above the body on the slide, a second slide cooperating with the first said slide to grip the said body with the fabric thereon, means to cause said slides to lift said body, means to fold over the edges of the piece on the body, means to lead a string onto the body and means to wind the string on the body wrapped in the piece of fabric and comprising two prongs adapted to grip the body and to turn and move it in the direction of its axis and relative to the means to lead the string.

8. A machine for wrapping cylindrical bodies with fabric, comprising a slide, means to bring the bodies one by one on said slide, means to bring a piece of fabric above the body on the slide, a second slide cooperating with the first said slide to grip the said body with the fabric thereon, means to cause said slides to lift said body, means to fold over the edges of the piece on the body, means to lead a string onto the body and means to wind the string on the body wrapped in the piece of fabric and comprising two prongs adapted to grip the body and to turn and move it in the direction of its axis and relative to the means to lead the string and means to secure the free end of the string to prevent the loosening of the tie.

In witness whereof I affix my signature.

ARNOLD SCHLAEPFER.